US012227701B2

(12) United States Patent
Khurshid et al.

(10) Patent No.: US 12,227,701 B2
(45) Date of Patent: Feb. 18, 2025

(54) METHODS AND APPARATUSES FOR MIXING CRUDE OIL AND WATER

(71) Applicant: Saudi Arabian Oil Company, Dhahran (SA)

(72) Inventors: Ahmed Khurshid, Dhahran (SA); Mishal Alkhaldi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 513 days.

(21) Appl. No.: 17/215,377

(22) Filed: Mar. 29, 2021

(65) Prior Publication Data

US 2022/0306945 A1 Sep. 29, 2022

(51) Int. Cl.

| | |
|---|---|
| ***C10G 33/06*** | (2006.01) |
| ***B01F 23/451*** | (2022.01) |
| ***B01F 25/314*** | (2022.01) |
| ***B01F 35/221*** | (2022.01) |

(52) U.S. Cl.

CPC ............ *C10G 33/06* (2013.01); *B01F 23/451* (2022.01); *B01F 25/31423* (2022.01); *B01F 35/2217* (2022.01); *B01F 2215/0422* (2013.01); *B01F 2215/0431* (2013.01); *B01F 2215/0468* (2013.01)

(58) Field of Classification Search

CPC ... C10G 33/06; B01F 23/451; B01F 25/31423

See application file for complete search history.

(56) References Cited

U.S. PATENT DOCUMENTS

| | | | | |
|---|---|---|---|---|
| 1,838,029 | A | 12/1931 | Isles | |
| 4,209,374 | A | 6/1980 | Martin | |
| 9,932,528 | B2 | 4/2018 | Sams et al. | |
| 2001/0033526 | A1* | 10/2001 | Illy .................. | B01F 25/31423 366/173.2 |
| 2003/0021182 | A1 | 1/2003 | Illy et al. | |

(Continued)

FOREIGN PATENT DOCUMENTS

WO WO-2007066660 A1 * 6/2007 ............ B01F 5/0475

OTHER PUBLICATIONS

International Search Report and Written Opinion dated Jan. 4, 2022 pertaining to International application No. PCT/US2021/033376 filed May 20, 2021, 17 pages.

*Primary Examiner* — Ellen M McAvoy
*Assistant Examiner* — Ming Cheung Po
(74) *Attorney, Agent, or Firm* — DINSMORE & SHOHL LLP

(57) ABSTRACT

An apparatus for mixing wash water and crude oil includes a crude oil pipe, a wash water manifold, a plurality of conduits, and a flow controller. The crude oil pipe includes a wall having an interior surface, an exterior surface, and a plurality of wash water injectors. The plurality of wash water injectors are angularly distributed on a circumferential band of the wall of the crude oil pipe. The flow controller is operable to regulate wash water flow through the plurality of conduits. Each of the plurality of wash water injectors is fluidly coupled to the wash water manifold by one of the plurality of conduits. The plurality of wash water injectors are arranged to provide mixing of the wash water and the crude oil when the wash water is injected into the crude oil pipe through the plurality of wash water injectors.

19 Claims, 9 Drawing Sheets

(56) References Cited

U.S. PATENT DOCUMENTS

| | | | | |
|---|---|---|---|---|
| 2013/0079550 | A1 | 3/2013 | Gillis et al. | |
| 2014/0202929 | A1 | 7/2014 | Mason et al. | |
| 2018/0086986 | A1* | 3/2018 | Hackett | G01N 33/2823 |
| 2019/0134576 | A1 | 5/2019 | Liu et al. | |
| 2020/0179883 | A1* | 6/2020 | Sabey | B01F 25/31241 |

* cited by examiner

METHODS AND APPARATUSES FOR MIXING CRUDE OIL AND WATER

TECHNICAL FIELD

The present disclosure generally relates to apparatus and methods for processing crude oil, and more specifically, to apparatus and methods for desalting crude oil.

BACKGROUND

Desalting crude oil is often one of the first steps of crude oil refining because salts dissolved in the water entrained in crude oil can have detrimental effects during crude oil refining processes. For example, salts present in crude oil during the refining process can form hydrochloric acid, which can corrode process equipment. Additionally, salts can precipitate out of solution and foul pipes and heat exchangers during refining. Furthermore, salts can poison various catalysts used during crude oil refining. As such, there is a need for processes to efficiently desalt crude oil before the crude oil is refined.

SUMMARY

Conventional crude oil desalting processes include mixing water with the crude oil to transfer at least some of the salts present in the crude oil into the water phase and subsequently separating the water phase from the crude oil, such as in a settling tank, where the greater portion of the salts is removed with the water phase. Typically, passing the crude oil and water through a pressure differential valve is the primary process for mixing the water with the crude oil during a crude oil desalting process. However, in some instances, passing the crude oil and water through the pressure differential valve may not provide sufficient mixing between the crude oil and the water to transfer the greater portion of the salts into the water phase. This can result in elevated levels of salt remaining in the desalted crude oil. The concentration of salts in the desalted crude oil can be reduced by increasing the water flow to the differential valve. However, this can greatly increase the water consumption of the desalting process. In certain regions of the world, water suitable for use in a desalting operation may be a scarce resource. Therefore, increased water consumption may not be desirable. Further, increased water flow rates may increase the size of downstream equipment and energy consumption required for separating the aqueous phase from the desalted crude oil. As such, there is a need for improved methods and apparatus for mixing crude oil and wash water for use in crude oil desalting processes.

One or more of the presently disclosed apparatuses and methods for mixing crude oil and wash water during crude oil desalting processes address these problems by introducing the wash water to the crude oil in the crude oil pipe in a manner that produces a greater degree of mixing between the wash water and crude oil compared to existing apparatuses and methods for introducing the wash water to the crude oil. The apparatuses of the present disclosure may include a crude oil pipe having a plurality of wash water injectors angularly distributed on a circumferential band of the wall of the crude oil pipe relative to a central axis of the crude oil pipe. Each of the wash water injectors may be fluidly coupled to a manifold operable to deliver wash water to each of the wash water injectors. The wash water may be injected into a crude oil pipe carrying crude oil through the wash water injectors. The wash water may be injected under flow conditions that promote mixing of the wash water with the crude oil. As such, injecting the wash water into the crude oil may serve as the primary mixing step in desalting processes of the present disclosure. In embodiments, a pressure differential valve may also be incorporated downstream of the wash water injectors to provide additional mixing between the wash water and crude oil. Use of the apparatuses and methods for mixing crude oil and wash water of the present disclosure may produce a greater degree of mixing between the wash water and crude oil, which may result in decreased wash water consumption and decreased salt content in the desalted crude oil, among other features.

In a first aspect of the present disclosure, an apparatus for mixing crude oil and wash water may include a crude oil pipe, a wash water manifold, a plurality of conduits, and a flow controller. The crude oil pipe may comprise a wall having an interior surface, an exterior surface, and a plurality of wash water injectors. The plurality of wash water injectors may be angularly distributed on a circumferential band of the wall of the crude oil pipe relative to a central axis of the crude oil pipe. A length of the circumferential band of the crude oil pipe may be less than 7 centimeters (cm). The flow controller may be operable to regulate wash water flow through the plurality of conduits. Each of the plurality of wash water injectors may be fluidly coupled to the wash water manifold by one of the plurality of conduits. Each of the plurality of wash water injectors may be operable to inject wash water into the crude oil pipe toward the central axis of the crude oil pipe and to contact the injected wash water with the crude oil at an injection interface aligned with the interior surface of the wall of the crude oil pipe. Each of the plurality of wash water injectors may be oriented to define a wash water injection direction that is within 90 degrees of a radial line that extends outward from a central axis of the crude oil pipe. The flow controller may be operable to inject wash water through the plurality of wash water injectors such that a collective volumetric flow rate of wash water injected through all of the wash water injectors is less than or equal to 20% of a volumetric flow rate of crude oil in the crude oil pipe. The flow controller may be operable to inject wash water through the plurality of wash water injectors at an average velocity from 10% to 40% greater than an average velocity of the crude oil in the crude oil pipe. The plurality of wash water injectors may be arranged to provide mixing of the wash water and the crude oil when the wash water is injected into the crude oil pipe through the plurality of wash water injectors.

A second aspect of the present disclosure may include the first aspect where the wash water injection direction may be within 85 degrees of the radial line that extends outward from the central axis of the crude oil pipe.

A third aspect of the present disclosure may include either one of the first or second aspects where the plurality of wash water injectors may be oriented to collectively define wash water injection directions that are normal to the central axis of the crude oil pipe, comprise a component in a downstream direction, comprise a component in an upstream direction, or combinations thereof.

A fourth aspect of the present disclosure may include any one of the first through third aspects where the wash water injection direction may intersect the central axis of the crude oil pipe.

A fifth aspect of the present disclosure may include any one of the first through fourth aspects where the flow controller may be operable to inject wash water through the plurality of wash water injectors such that a collective volumetric flow rate of wash water injected through all of the wash water injectors is from 10% to 20% of the volumetric flow rate of crude oil in the crude oil pipe.

A sixth aspect of the present disclosure may include any one of the first through fifth aspects where the flow controller may be operable to inject the wash water through the plurality of wash water injectors at an average velocity from 10% to 30% greater than an average velocity of the crude oil in the crude oil pipe.

A seventh aspect of the present disclosure may include any one of the first through sixth aspects where the flow controller may be operable to inject the wash water such that a pressure of the wash water is from 110 pounds per square inch (psi, 76,000 Pa) to 200 psi (1,340,000 Pa) at each of the plurality of wash water injectors.

An eighth aspect of the present disclosure may include any one of the first through seventh aspects where the flow controller may be operable to inject the wash water such that a pressure of the wash water is from 140 psi (97,000 Pa) to 200 psi (1,340,000 Pa) at each of the plurality of wash water injectors.

A ninth aspect of the present disclosure may include any one of the first through eighth aspects where each of the plurality of wash water injectors may be oriented to define a wash water injection direction that is within 85 degrees of a radial line that extends outward from a central axis of the crude oil pipe, and the flow controller may be operable to inject wash water through the plurality of wash water injectors such that a collective volumetric flow rate of wash water injected through all of the wash water injectors is from 10% to 20% of the volumetric flow rate of crude oil in the crude oil pipe.

A tenth aspect of the present disclosure may include any one of the first through ninth aspects where each of the plurality of wash water injectors may be oriented to define a wash water injection direction that is within 85 degrees of a radial line that extends outward from a central axis of the crude oil pipe, and the flow controller may be operable to inject the wash water through the plurality of wash water injectors at an average velocity from 10% to 30% greater than an average velocity of the crude oil in the crude oil pipe.

An eleventh aspect of the present disclosure may include any one of the first through tenth aspects where the flow controller may be operable to inject wash water through the plurality of wash water injectors such that a collective volumetric flow rate of wash water injected through all of the wash water injectors is from 10% to 20% of the volumetric flow rate of crude oil in the crude oil pipe, and the flow controller may be operable to inject the wash water through the plurality of wash water injectors at an average velocity from 10% to 30% greater than an average velocity of the crude oil in the crude oil pipe.

A twelfth aspect of the present disclosure may include any one of the first through eleventh aspects where each of the plurality of wash water injectors may be oriented to define a wash water injection direction that is within 85 degrees of a radial line that extends outward from a central axis of the crude oil pipe, the flow controller may be operable to inject wash water through the plurality of wash water injectors such that a collective volumetric flow rate of wash water injected through all of the wash water injectors is from 10% to 20% of the volumetric flow rate of crude oil in the crude oil pipe, and the flow controller may be operable to inject the wash water through the plurality of wash water injectors at an average velocity from 10% to 30% greater than an average velocity of the crude oil in the crude oil pipe.

A thirteenth aspect of the present disclosure may include any one of the first through twelfth aspects where the plurality of wash water injectors may be angularly distributed on the circumferential band of the wall of the crude oil pipe relative to the central axis of the crude oil pipe, where the length of the circumferential band of the crude oil pipe is less than 5 cm.

A fourteenth aspect of the present disclosure may include any one of the first through thirteenth aspects where the plurality of wash water injectors may be angularly distributed on the circumferential band of the wall of the crude oil pipe relative to the central axis of the crude oil pipe, where the length of the circumferential band of the crude oil pipe is less than 3% of a diameter of the crude oil pipe.

A fifteenth aspect of the present disclosure may include any one of the first through fourteenth aspects where each of the plurality of wash water injectors do not extend inward towards the central axis of the crude oil pipe past the interior surface of the wall of the crude oil pipe.

A sixteenth aspect of the present disclosure may include any one of the first through fifteenth aspects where the plurality of wash water injectors may be spaced on the circumferential band by 90 degrees or less, relative to the central axis of the crude oil pipe.

A seventeenth aspect of the present disclosure may include any one of the first through sixteenth aspects where the plurality of wash water injectors may be spaced on the circumferential band by between 60 degrees and 90 degrees, relative to the central axis of the crude oil pipe.

In an eighteenth aspect of the present disclosure, a system for desalting crude oil may comprise the apparatus according to any one of the first through seventeenth aspects; a pressure differential valve, where the pressure differential valve may be positioned in the crude oil pipe downstream of the wash water injectors and may be operable to provide further mixing of a mixed stream comprising the combination of the crude oil and the wash water; and a separator vessel operable to separate the mixed stream into a water phase and an oil phase.

In a nineteenth aspect of the present disclosure, a method for mixing crude oil and wash water may include passing crude oil through a crude oil pipe and injecting wash water into the crude oil pipe through a plurality of wash water injectors. The crude oil pipe may comprise a wall having an interior surface, an exterior surface, and the plurality of wash water injectors. The plurality of wash water injectors may be angularly distributed on a circumference of the wall of the crude oil pipe. Each of the plurality of wash water injectors may be oriented to define a wash water injection direction that is within 90 degrees of a radial line that extends outward from a central axis of the crude oil pipe. Each of the plurality of wash water injectors may be operable to contact the injected wash water with the crude oil at an injection interface aligned with the interior surface of the wall of the crude oil pipe. Each of the plurality of wash water injectors may be fluidly coupled to a wash water manifold by a conduit. The wash water may be injected into the crude oil pipe through the plurality of wash water injectors such that a collective volumetric flow rate of wash water injected through all of the wash water injectors is less than or equal to 20% of a volumetric flow rate of crude oil in the crude oil pipe. The wash water may be injected into the crude oil pipe through the plurality of wash water injectors at an average velocity and is from 10% to 40% greater than an average velocity of the crude oil in the crude oil pipe.

In a twentieth aspect of the present disclosure, a method for desalting crude oil may include passing crude oil through a crude oil pipe, injecting wash water into the crude oil pipe through a plurality of wash water injectors, passing the mixed stream through a pressure differential valve, and separating the mixed stream into a water phase and an oil phase. The crude oil pipe may comprise a wall having an interior surface, an exterior surface, and the plurality of wash water injectors. The plurality of wash water injectors may be angularly distributed on a circumference of the wall of the crude oil pipe. Each of the plurality of wash water injectors may be oriented to define a wash water injection direction that is within 90 degrees of a radial line that extends outward from a central axis of the crude oil pipe. Each of the plurality of wash water injectors may be operable to contact the injected wash water with the crude oil at an injection interface aligned with the interior surface of the wall of the crude oil pipe. Each of the plurality of wash water injectors may be fluidly coupled to a wash water manifold by a conduit. The wash water may be injected into the crude oil pipe through the plurality of wash water injectors such that a collective volumetric flow rate of wash water injected through all of the wash water injectors is less than or equal to 20% of a volumetric flow rate of crude oil in the crude oil pipe. The wash water may be injected into the crude oil pipe through the plurality of wash water injectors at an average velocity and is from 10% to 40% greater than an average velocity of the crude oil in the crude oil pipe. The pressure differential valve may be positioned in the crude oil pipe downstream of the wash water injectors and may be operable to provide further mixing of the mixed stream. The oil phase has a salinity below a target salinity.

A twenty-first aspect may include the twentieth aspect where the target salinity may be less than 10 pounds per thousand barrels.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description that follows, and in part will be readily apparent to those skilled in the art from that description or recognized by practicing the technology as described herein, including the detailed description that follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
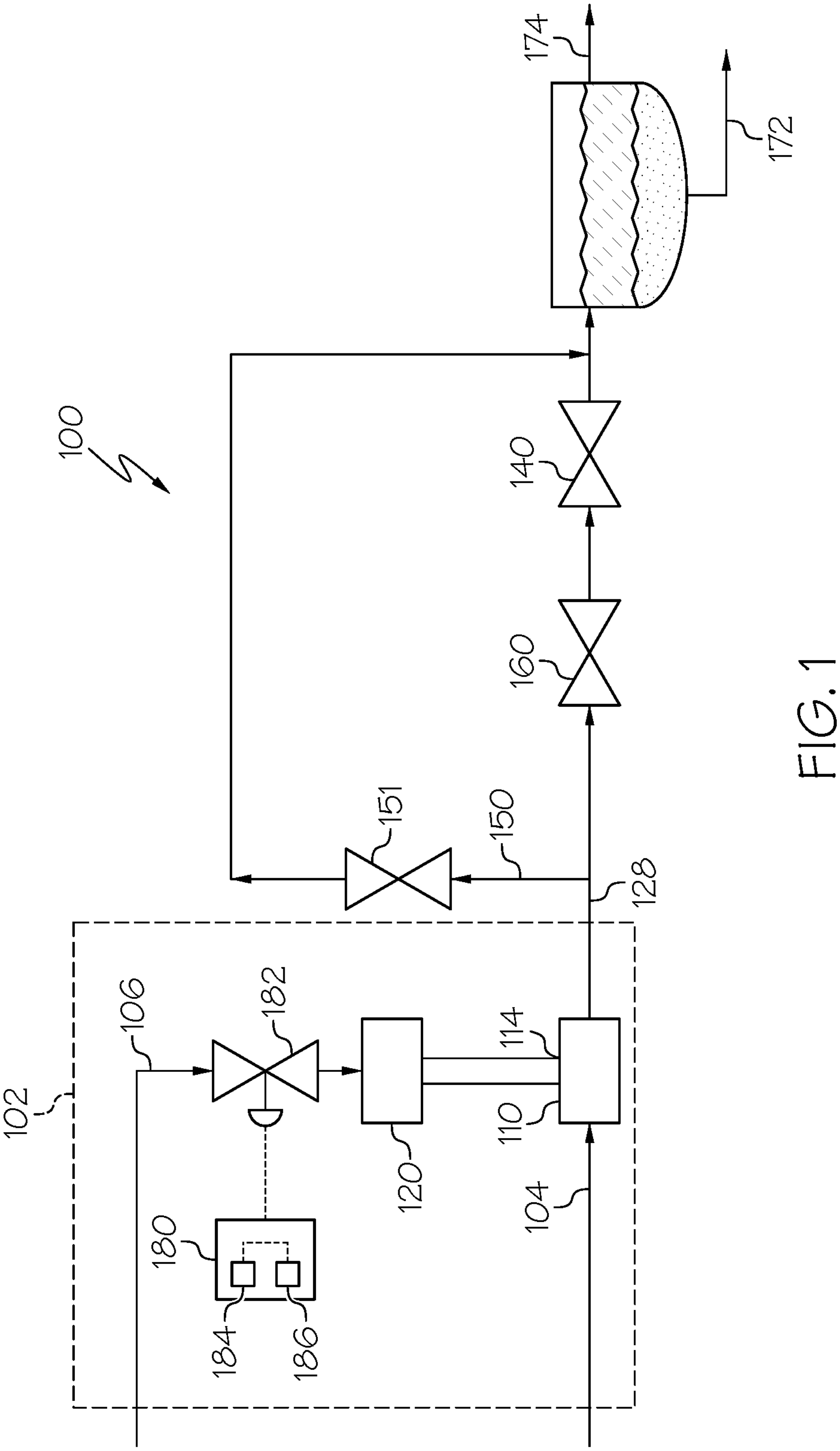
FIG. 1 schematically depicts a crude oil desalting system comprising an apparatus for mixing crude oil and wash water, according to embodiments shown and described in the present disclosure.

Additionally, the arrows in the simplified schematic illustrations of FIGS. 1-8 refer to process streams, unless explicitly stated otherwise. However, the arrows may equivalently refer to transfer lines or pipes, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1-8 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Moreover, two or more lines intersecting in the simplified schematic illustrations of FIGS. 1-8 may refer to two or more process streams being "mixed" or "combined". Mixing or combining two or more process streams may comprise mixing or combining by directly introducing both streams into a like reactor, separation device, or other system component. For example, two lines intersecting prior to entering a system component may signify the introduction of the two process streams into the system component, in which mixing or combining occurs.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 2:
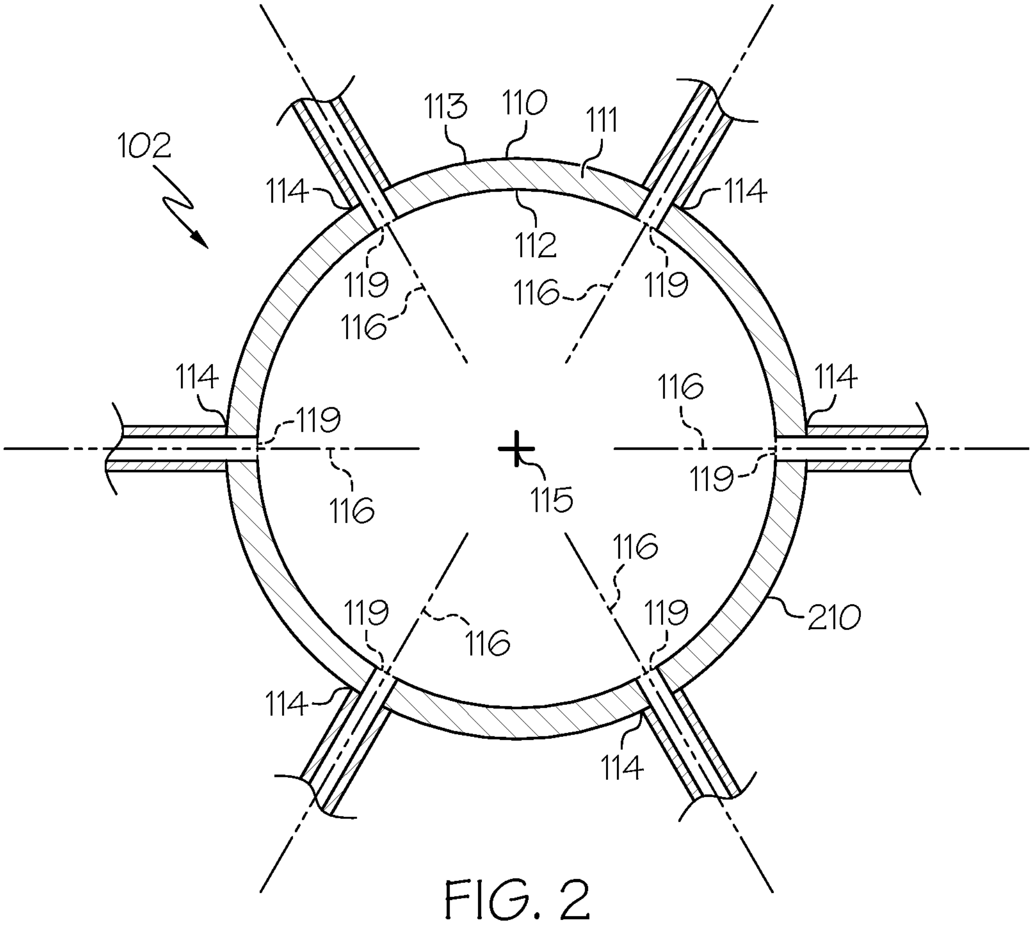
FIG. 2 schematically depicts a cross-sectional view of a crude oil pipe having a plurality of wash water injectors, where the cross-section is taken along a plane perpendicular to a central axis of the crude oil pipe, according to embodiments shown and described in the present disclosure.

Embodiments of the present disclosure are directed to apparatuses and methods for desalting crude oil. Generally, crude oil may be desalted by mixing crude oil with wash water so that salts contained in the crude oil can be dissolved into the wash water and then removed by separating the water phase from the crude oil. Referring to FIGS. 2 and 5, one embodiment of an apparatus 102 of the present disclosure for mixing crude oil and wash water is schematically depicted. Referring to FIG. 2, the apparatus 102 for mixing crude oil and wash water may include a crude oil pipe 110 comprising a wall 111 having an interior surface 112, an exterior surface 113, and a plurality of wash water injectors 114, where the plurality of wash water injectors 114 may be angularly distributed on a circumferential band of the wall 111 of the crude oil pipe 110 relative to a central axis 115 of the crude oil pipe 110. Referring to FIG. 5, the apparatus 102 may further comprise a wash water manifold 120, a plurality of conduits 130, and a flow controller 180. Each of the plurality of wash water injectors 114 may be fluidly coupled to the wash water manifold 120 by one of the plurality of conduits 130. Each of the plurality of wash water injectors 114 may be operable to inject wash water 106 into the crude oil pipe 110 in a direction towards the central axis 115 of the crude oil pipe 110. The flow controller 180 may be operable to inject wash water through the plurality of wash water injectors 114 such that a collective volumetric flow rate of wash water injected through all the wash water injectors 114 is less than or equal to 20% of a volumetric flow rate of the crude oil in the crude oil pipe 110. The flow controller 180 may also be operable to inject wash water through the plurality of wash water injectors 114 at an average velocity from 10% to 30% greater than an average velocity of the crude oil in the crude oil pipe 110. The plurality of wash water injectors 114 may be arranged to provide mixing of wash water and crude oil when wash water is injected into the crude oil pipe 110 through the plurality of wash water injectors 114.

Methods for mixing crude oil and wash water may include passing crude oil through the crude oil pipe 110 of the apparatus 102. The crude oil pipe 110 may comprise the wall 111 having the interior surface 112, the exterior surface 113 and the plurality of wash water injectors 114. The plurality of wash water injectors 114 may be angularly distributed on a circumferential band of the wall 111 of the crude oil pipe 110 relative to a central axis 115 of the crude oil pipe 110. Each of the plurality of wash water injectors 114 may be fluidly coupled to the wash water manifold 120 by one of the plurality of conduits 130. The methods may further comprise injecting wash water into the crude oil pipe 110 through the plurality of wash water injectors 114. Injecting wash water into the crude oil pipe 110 through the plurality of wash water injectors 114 distributed angularly around a circumference wall 111 of the crude oil pipe 110 may mix the wash water and the crude oil. The apparatus and methods of the present disclosure may produce a great degree of mixing between the wash water and the crude oil to improve the mass transfer of salts from the crude oil into the wash water during the desalting processes. The greater degree of mixing produced by the apparatuses and methods of the present disclosure compared to existing methods of introducing wash water to crude oil during desalting may allow for reduced consumption of wash water, reduced salt content in the desalted crude oil, or both. Other features of the apparatuses and methods of the present disclosure may be realized through practice of the subject matter.

The indefinite articles "a" and "an" are employed to describe elements and components of the present disclosure. The use of these articles means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used in the present disclosure, also signifies that the modified noun may be singular or plural, again unless otherwise stated in specific instances.

As used throughout the present disclosure, the terms "upstream" and "downstream" refer to the positioning of components or units of the system 100 relative to a direction of flow of materials through the system 100. For example, a first component may be considered "upstream" of a second component if materials flowing through the system 100 encounter the first component before encountering the second component. Likewise, the second component is considered "downstream" of the first component if the materials flowing through the system 100 encounter the first component before encountering the second component.

Various components described herein may be "directly connected." As used in the present disclosure, components are "directly connected" when they are attached to one another by any suitable bonding system such as a weld, an adhesive, a solder, etc. When components are directly connected, there is no intervening structure between the components. Bonding materials, such as adhesives, solder or other bonding agents, are not considered to be intervening structures.

Generally, "inlets" and "outlets" of a component described herein refer to openings, holes, channels, apertures, gaps, or other mechanical features in the component. For example, inlets may allow for the entrance of material to a particular component and an outlet may allow for the exit of material from a particular component. While inlets and outlets may sometimes be described functionally in operation, they may have similar or identical physical characteristics, and the respective functions in an operational system should not be construed as limiting on their physical structures.

The present disclosure generally relates to systems and methods for mixing crude oil and wash water. Embodiments of these systems and methods for mixing crude oil and wash water are described in the context of a crude oil desalting system. Generally, methods for desalting crude oil include mixing crude oil and wash water such that at least a portion of the salts in the crude oil are dissolved by the wash water and then separating the wash water from the crude oil. As such, apparatuses and methods for mixing crude oil with wash water and for desalting crude oil will be described in detail herein.

Referring now to FIG. 1, one embodiment of a system 100 for desalting crude oil according to the present disclosure is schematically depicted. The system 100 for desalting crude oil may comprise the apparatus 102 for mixing wash water 106 and crude oil 104. The apparatus 102 may comprise the crude oil pipe 110 having the plurality of wash water injectors 114 (FIG. 2) and the wash water manifold 120 in fluid communication with each of the wash water injectors 114 of the crude oil pipe 110. The system 100 for desalting crude oil may further comprise a pressure differential valve 140 downstream of the apparatus 102 for mixing crude oil 104 and wash water 106. The system 100 for desalting crude oil may further comprise a bypass line 150. The bypass line 150 may comprise a bypass valve 151 and the crude oil line may comprise an isolation valve 160. The isolation valve 160 may be closed and bypass valve 151 may be opened so that the pressure differential valve 140 may be bypassed. Likewise, bypass valve 151 may be closed and isolation valve 160 may be opened in embodiments where it is not desirable to bypass the pressure differential valve 140. The system 100 for desalting crude oil may further comprise a separator vessel 170 for separating the wash water from the crude oil to produce a desalted crude oil.

Referring now to FIG. 2, a cross-sectional view of the crude oil pipe 110 of the apparatus 102 for mixing wash water and crude oil is schematically depicted. The crude oil pipe 110 comprises a plurality of wash water injectors 114 positioned at a plurality of angular positions on a circumferential band of the of the crude oil pipe 110. The crude oil pipe 110 may comprise the wall 111. The wall 111 may comprise the interior surface 112 and the exterior surface 113. Generally, the wall 111 of the crude oil pipe 110 may comprise carbon steel, stainless steel, or any other suitable metal or alloys. The crude oil pipe 110 may be cylindrically shaped and may have a substantially circular cross-sectional shape. In embodiments, the crude oil pipe 110 may have a non-circular cross-sectional shape, such as but not limited to a triangle, rectangle, pentagon, hexagon, octagon, oval, other polygon or curved closed shape or combinations of these. The crude oil pipe 110 may comprise the central axis 115, which may extend along a length of the crude oil pipe 110, where the length of the crude oil pipe 110 is orthogonal to the cross-sectional area of the crude oil pipe 110.

The crude oil 104 passed to the apparatus 102 may be a naturally occurring hydrocarbon composition that may be found and extracted from a subterranean geologic formation. The crude oil may have undergone no processing or minimal processing after being removed from a reservoir. In embodiments, the crude oil 104 may have been treated in a solids separator to remove solids from the crude oil. The crude oil 104 may be characterized by its American Petroleum Institute (API) gravity. For example, crude oil contemplated for use in embodiments may have an API gravity from 20° to 40°, or from 30° to 35°. The crude oil 104 may comprise impurities including salts. These salts may include calcium chloride, sodium chloride, and magnesium chloride, among others.

The crude oil pipe 110 may include the plurality of wash water injectors 114, which may be openings in the wall 111 of the crude oil pipe 110. In embodiments, the crude oil pipe 110 may comprise from 4 to 8 wash water injectors, such as 4, 5, 6, 7, or 8 wash water injectors 114. In embodiments, the crude oil pipe 110 may include more than 8 wash water injectors 114. Each of the wash water injectors 114 may comprise a fitting directly connected to the wall 111 of the crude oil pipe 110, where the fitting defines a fluid passage through the wall 111 of the crude oil pipe 110. In embodiments, no part of the fitting defining the wash water injectors 114 extends past the interior surface 112 of the wall 111 of the crude oil pipe 110. In other words, the fittings of the wash water injectors 114 remain flush with the interior surface 112 of the wall 111 of the crude oil pipe 110 and do not protrude inward from the interior surface 112 of the wall 111 into the interior cavity defined by the crude oil pipe 110. In such embodiments, each of the plurality of wash water injectors may be operable to contact the flow of wash water 106 with the crude oil 104 at an injection interface 119 aligned with the interior surface 112 of the wall 111 of the crude oil pipe 110.

Figure 3A:
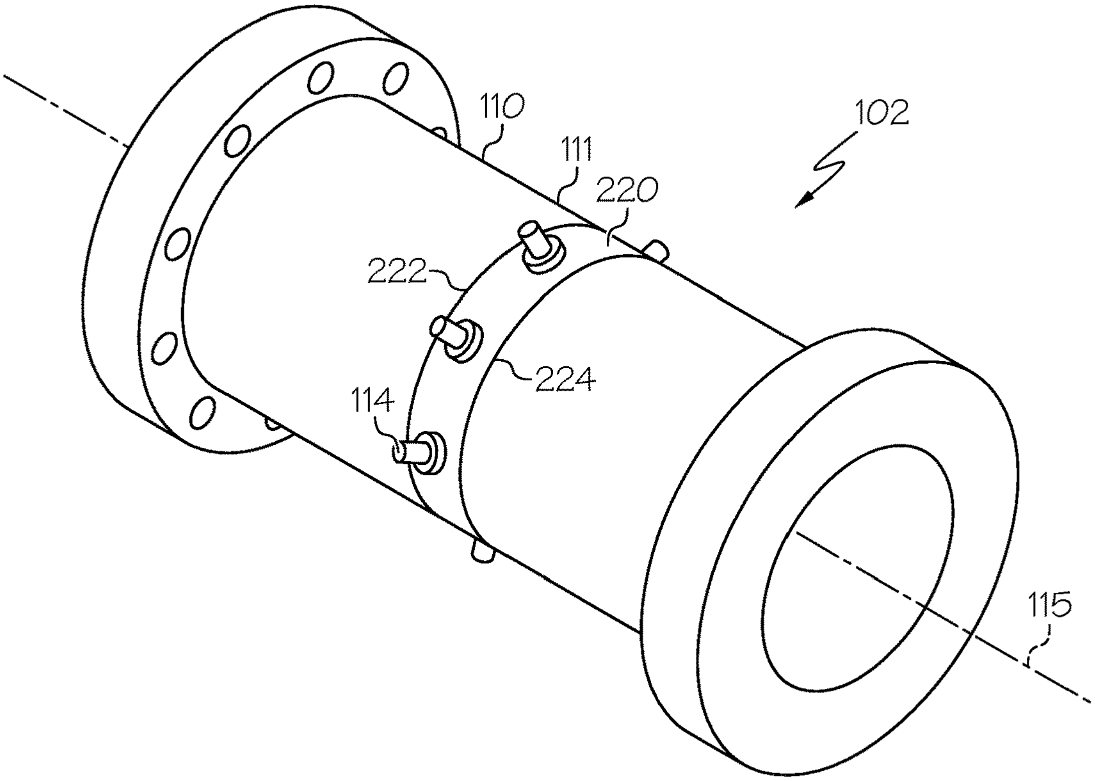
FIG. 3A schematically depicts a perspective view of a crude oil pipe having a plurality of wash water injectors, according to embodiments shown and described in the present disclosure.
Figure 3B:
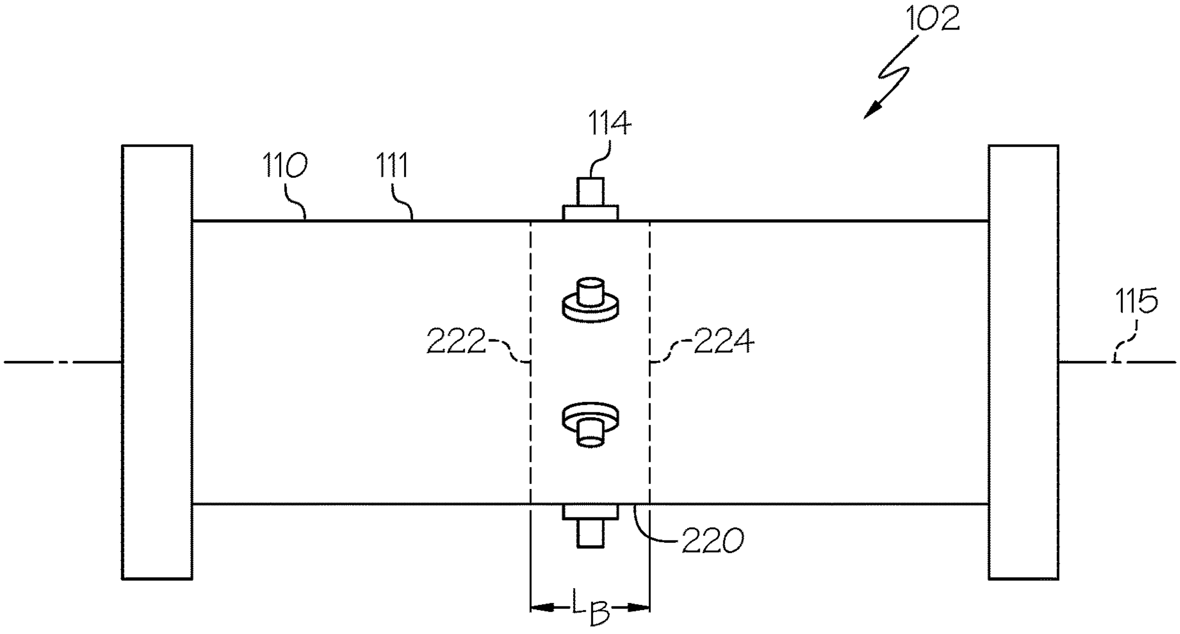
FIG. 3B schematically depicts a side view of the crude oil pipe of FIG. 3A having the plurality of wash water injectors, according to embodiments shown and described in the present disclosure.

Referring now to FIGS. 3A and 3B, the plurality of wash water injectors 114 may be angularly distributed on a circumferential band 220 of the wall 111 of the crude oil pipe 110 relative to the central axis 115 of the crude oil pipe 110. As described herein, a "circumferential band" 220 of the wall 111 of the crude oil pipe 110 refers to a section of the wall 111 of the crude oil pipe 110 between a first circumference 222 of the wall 111 of the crude oil pipe 110 and a second circumference 224 of the wall 111 of the crude oil pipe 110. A length $L_B$ of the circumferential band 220 refers to the distance between the first circumference 222 of the wall 111 of the crude oil pipe 110 and a second circumference 224 of the wall 111 of the crude oil pipe 110. In embodiments, the length $L_B$ of the circumferential band 220 of the wall 111 of the crude oil pipe 110 may be less than or equal to 7 cm. In further embodiments, the length $L_B$ of the circumferential band 220 of the wall 111 of the crude oil pipe 110 may be less than or equal to 5 cm. In embodiments, the length $L_B$ of the circumferential band 220 of the wall 111 of the crude oil pipe 110 may be less than or equal to 3 cm. For example, the length $L_B$ of the circumferential band 220 of the wall 111 of the crude oil pipe 110 may be from 0.5 cm to 7 cm, from 1 cm to 7 cm, from 1.5 cm to 7 cm, from 2 cm to 7 cm, from 2.5 cm to 7 cm, from 3 cm to 7 cm, from 3.5 cm to 7 cm, from 4 cm to 7 cm, from 4.5 cm to 7 cm, from 5 cm to 7 cm, from 5.5 cm to 7 cm, form 6 cm to 7 cm, from 6.5 cm to 7 cm, from 0.5 cm to 6.5 cm, from 0.5 cm to 6 cm, from 0.5 cm to 5.5 cm, from 0.5 cm to 5 cm, from 0.5 cm to 4.5 cm, from 0.5 cm to 4 cm, from 0.5 cm to 3.5 cm, from 0.5 to 3 cm, from 0.5 to 2.5 cm, from 0.5 cm to 2 cm, from 0.5 cm to 2 cm, from 0.5 cm to 1.5 cm, from 0.5 cm to 1 cm, or any combination or sub-combination of these ranges. In embodiments, the plurality of wash water injectors 114 may be angularly distributed on the circumferential band of the wall 111 of the crude oil pipe 110 relative to the central axis 115 of the crude oil pipe 110, where the length $L_B$ of the circumferential band 220 of the crude oil pipe 110 is less than or equal to 3% of the diameter of the crude oil pipe 110. Without intending to be bound by any particular theory, it is believed that the angular distribution of the wash water injectors 114 on a circumferential band 220 of the wash water pipe 110 may provide enhanced mixing between the crude oil 104 and the wash water 106 when the wash water 106 is injected into the crude oil pipe 110 through the plurality of wash water injectors 114.

Referring again to FIG. 2, each of the plurality of wash water injectors 114 may be oriented to define a wash water injection direction 116. The wash water injection direction 116 may be parallel to a central axis of each of the plurality of wash water injectors 114. In embodiments, the wash water injection direction 116 may extend radially toward the central axis 115 of the crude oil pipe 110.

The plurality of wash water injectors 114 may be spaced on the circumferential band 220 by 90 degrees or less, relative to the central axis 115 of the crude oil pipe 110. In embodiments, the plurality of wash water injectors 114 may be spaced on the circumferential band 220 by from 60 degrees and 90 degrees, relative to the central axis 115 of the crude oil pipe 110. In embodiments, the plurality of wash water injectors 114 may be evenly spaced angularly on the circumferential band 220 of the crude oil pipe 110. In embodiments where the crude oil pipe 110 has a substantially circular cross-sectional shape, an arc length between each of the plurality of wash water injectors 114 may be substantially the same, where the arc length is defined as the length of an arc 210 along the outer circumference of the crude oil pipe 110 from the central axis of each wash water injector 114 to the next closest wash water injector 114. The arc length may be considered to be substantially the same when the arc length does not deviate by more than 5% from the average arc length between the wash water injectors 114. In other words, the arc length between any two immediately adjacent wash water injectors 114 may deviate by less than 5% from the average arc length, which is averaged over all the immediately adjacent pairs of wash water injectors 114. In embodiments, the plurality of wash water injectors 114 may be positioned symmetrically around a cross-section of the crude oil pipe 110. Without intending to be bound by any particular theory, it is believed that spacing the wash water injectors 114 around the crude oil pipe 110 as described herein may result in substantially even distribution of wash water to the crude oil in the crude oil pipe 110, resulting in enhanced mixing (greater degree of mixing) between the wash water and the crude oil compared to a single wash water inlet. In embodiments, the plurality of wash water injectors 114 may be aligned axially at a single position along the central axis 115 of the crude oil pipe 110.

Figure 4:
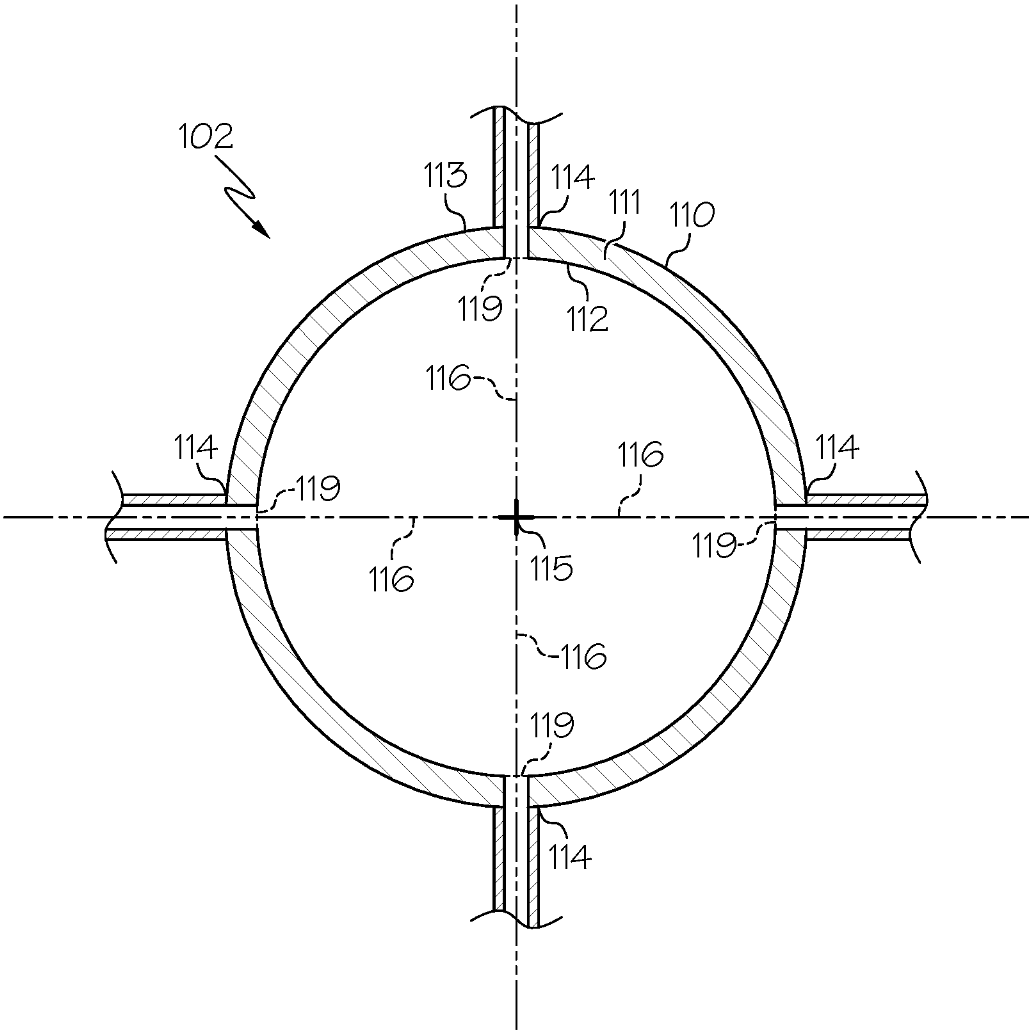
FIG. 4 schematically depicts a cross-sectional view of another embodiment of a crude oil pipe having a plurality of wash water injectors, where the cross-section is taken along a plane perpendicular to a central axis of the crude oil pipe, according to embodiments shown and described in the present disclosure.

Referring now to FIG. 4, each of the plurality of wash water injectors 114 may be positioned such that the wash water injection direction 116 of each wash water injector 114 may be normal to the central axis 115 of the crude oil pipe 110. In other words, each of the plurality of the wash water injectors 114 may be positioned so that the wash water injection direction 116 of each wash water injector 114 may extend radially inward to intersect with the central axis 115 of the crude oil pipe 110. In such embodiments, the wash water injection direction 116 of each of the plurality of wash water injectors 114 may be normal to the interior surface 112 of the wall 111 of the crude oil pipe 110, the exterior surface 113 of the wall 111 of the crude oil pipe 110, or both.

Figure 5A:
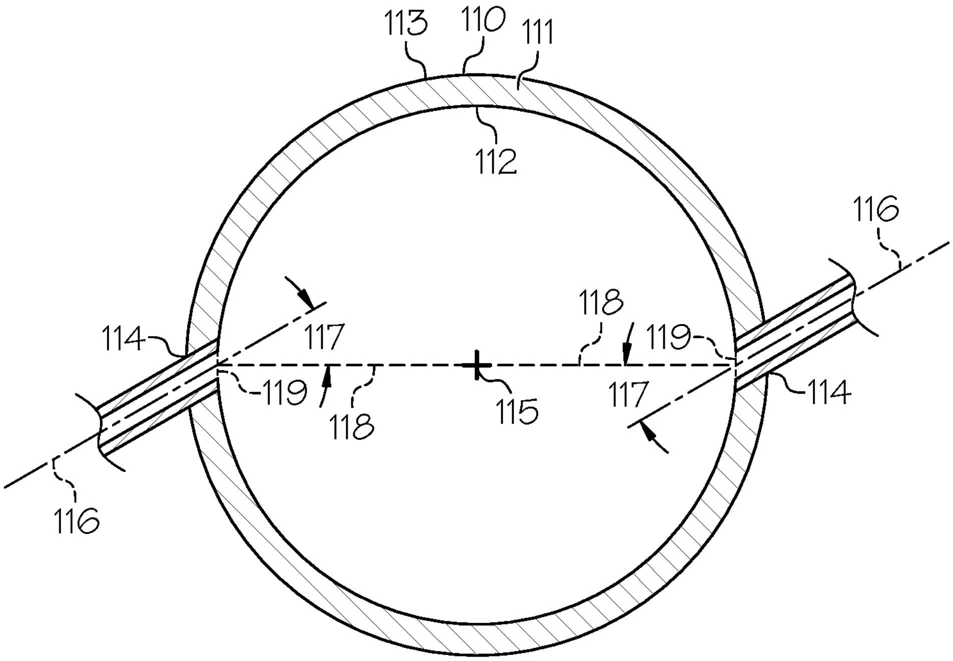
FIG. 5A schematically depicts a cross-sectional view of still another embodiment of a crude oil pipe having a plurality of wash water injectors, where the cross-section is taken along a plane perpendicular to a central axis of the crude oil pipe, according to embodiments shown and described in the present disclosure.

Referring now to FIG. 5A, in embodiments, each of the plurality of wash water injectors 114 may be oriented to define a wash water injection direction 116 that is within 90 degrees of a radial line 118 that extends outward from a central axis 115 of the crude oil pipe 110. The radial line 118 is normal to the central axis 115 of the crude oil pipe 110 and angle 117 illustrates the deviation of the wash water injection direction 116 from the radial line 118. When the wash water injection direction 116 is normal to the central axis 115 of the crude oil pipe 110, the wash water injection direction 116 overlaps (e.g., is congruent with) the radial line 118 and the angle 117 is 0 (zero) degrees. In embodiments, the angle 117 may be any angle from 0 (zero) degrees to 85 degrees. In embodiments, the angle 117 may be any angle from 0 (zero) degrees to 80 degrees. For example, the angle 117 may be any angle from 0 (zero) degrees to 90 degrees, 85 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees, 10 degrees, 5 degrees or any combination or sub-combination of these ranges.

Figure 5B:
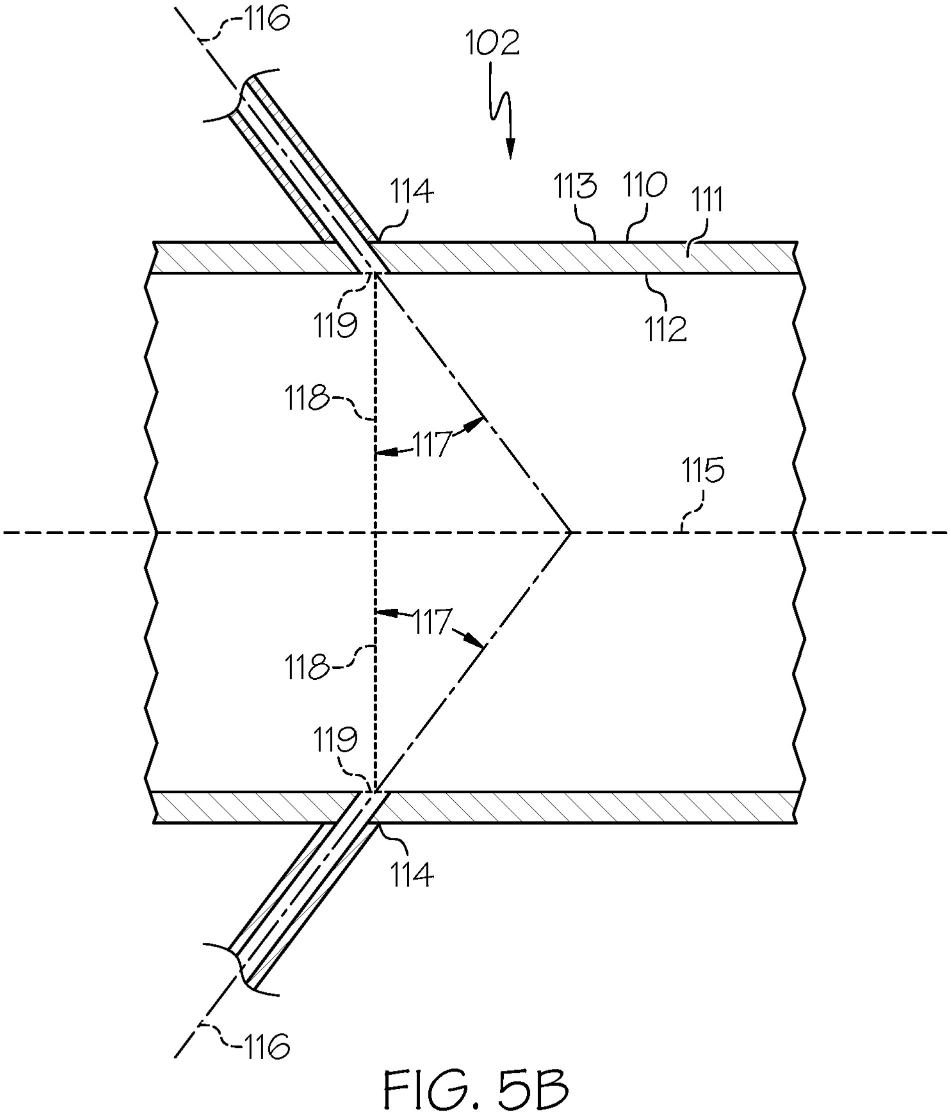
FIG. 5B schematically depicts a side cross-sectional view of yet another embodiment of a crude oil pipe having a plurality of wash water injectors, where the side cross-section is taken along a vertical plane that includes the central axis of the crude oil pipe, according to embodiments shown and described in the present disclosure.

Still referring to FIG. 5A, the wash water injection direction 116 of each of the plurality of wash water injectors 114 may be skewed relative to the central axis 115 of the crude oil pipe 110. Referring now to FIG. 5B, in embodiments, the wash water injection direction 116 of each of the plurality of wash water injectors 114 may be co-planar with the central axis 115 of the crude oil pipe 110. In other words, the wash water injection direction 116 of each of the plurality of wash water injectors 114 may intersect the central axis 115 of the crude oil pipe 110 even when angle 117 is non-zero.

In embodiments, the wash water injection direction 116 of each of the plurality of wash water injectors 114 may comprise a component in a downstream direction. In such embodiments, a velocity vector of an average velocity of the wash water 106 injected from each of the plurality of wash water injectors 114 may have a velocity vector component parallel to the central axis 115 of the crude oil pipe 110 in the downstream direction. Likewise, in embodiments, the wash water injection direction 116 of each of the plurality of wash water injectors 114 may comprise a component in an upstream direction. In such embodiments, a velocity vector of an average velocity of the wash water 106 injected from each of the plurality of wash water injectors 114 may have a velocity vector component parallel to the central axis 115 of the crude oil pipe 110 in the upstream direction. In embodiments, each of the plurality of wash water inlets 114 may be positioned such that the wash water injection direction 116 has the same angle 117 relative to a radial line 118 that extends outward from a central axis 115 of the crude oil pipe 110. In embodiments, one or more of the plurality of wash water inlets 114 may be positioned such that the wash water injection direction 116 has a different angle 117 relative to a radial line 118 that extends outward from the central axis 115 of the crude oil pipe 110 than one or more of the other wash water inlets 114.

Without intending to be bound by any particular theory, it is believed that orienting the plurality of wash water injectors 114 such that angle 117 is non-zero may further enhance the mixing of the wash water and crude oil. Specifically, angling the plurality of wash water injectors 114 may increase the turbulence of the flow of wash water and crude oil where the wash water is injected into the crude oil pipe 110. This increase in turbulence may result in enhanced mixing between the crude oil and the wash water.

The apparatus 102 for mixing crude oil and wash water may comprise a wash water manifold 120. The wash water manifold 120 may be in fluid communication with a wash water source. The wash water source may provide suitable wash water to the system 100 for desalting crude oil. Suitable types of wash water may include, but are not limited to, municipal water, distilled water, deionized water, tap water, surface water, well water, rain water, treated water, reclaimed water, or combinations of these. Other water sources may also be used provided the water source is capable of dissolving additional salts from the crude oil into the water phase. In embodiments, the wash water may have a salinity that is less than that of the crude oil such that the wash water may dissolve the salts in the crude oil during the desalting process.

Figure 6:
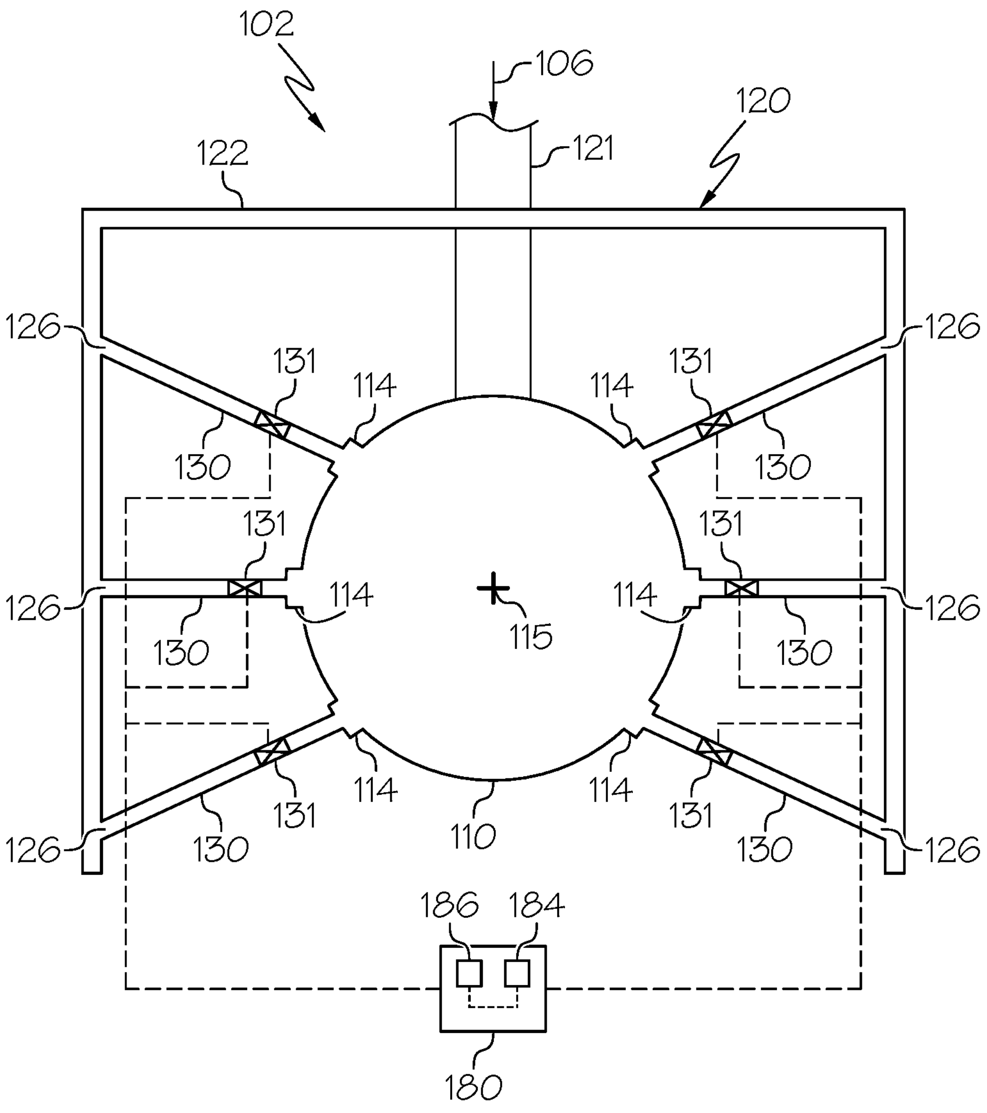
FIG. 6 schematically depicts a front view of a wash water manifold connected to a crude oil pipe, according to embodiments shown and described in the present disclosure.
Figure 7:
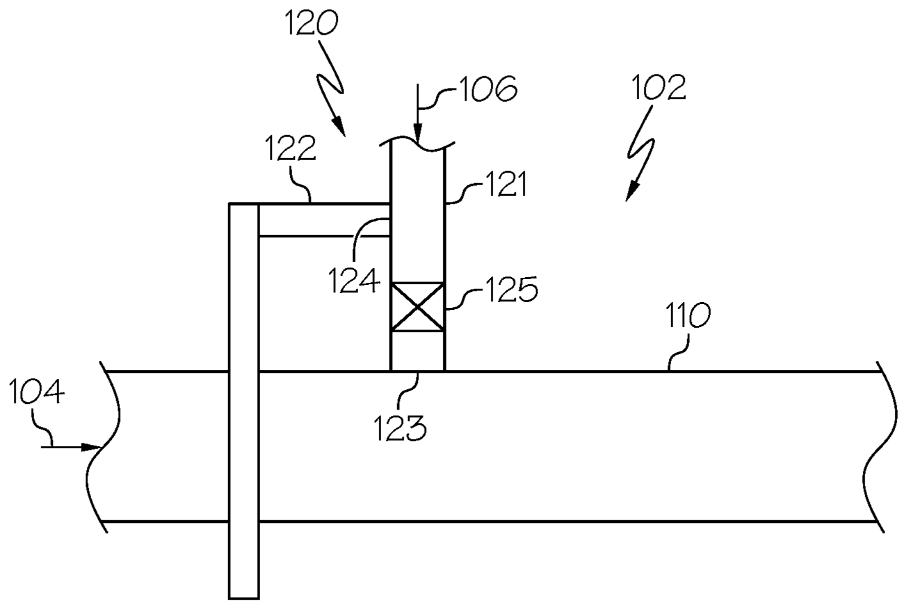
FIG. 7 schematically depicts a side view of the wash water manifold of FIG. 6 connected to the crude oil pipe, according to embodiments shown and described in the present disclosure.
Figure 8:
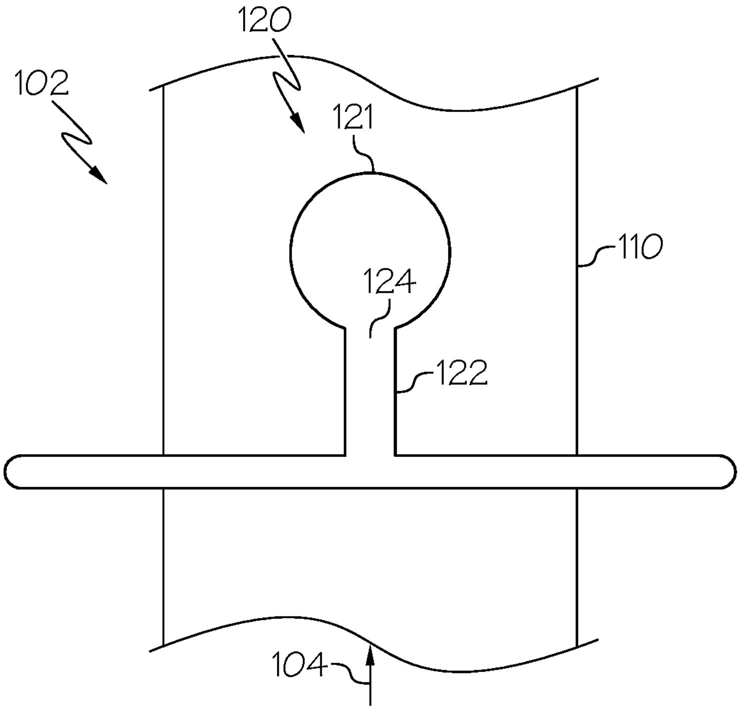
FIG. 8 schematically depicts a top view of the wash water manifold of FIG. 6 connected to the crude oil pipe, according to embodiments shown and described in the present disclosure.

Referring now to FIGS. 6, 7, and 8, a front view, a side view, and a top view, respectively, of the wash water manifold 120 in fluid communication with a crude oil pipe 110 are schematically depicted. The apparatus 102 for mixing crude oil and wash water may comprise the wash water manifold 120. Generally, the wash water manifold 120 may be shaped to distribute wash water 106 to each of the plurality of wash water injectors 114. As depicted in FIGS. 6, 7, and 8, the wash water manifold 120 may comprise wash water pipe 121 and a branched piping structure 122. Generally, the branched piping structure 122 may allow the wash water 106 to be distributed to each of the plurality of wash water injectors 114 angularly distributed around the circumference the crude oil pipe 110.

The wash water pipe 121 may be cylindrically shaped, having a substantially circular cross-sectional shape. In embodiments, the wash water pipe 121 may be non-cylindrically shaped, such as prism shaped, having a cross-sectional shape of a triangle, rectangle, pentagon, hexagon, octagon, oval, other polygon or curved closed shape or combinations thereof. The wash water pipe 121 may be directly connected to the branched piping structure 122 at outlet 124.

Additionally, the wash water pipe 121 may be directly connected to the crude oil pipe 110 at a supplemental wash water injector 123. Generally, supplemental wash water injector 123 may be downstream of the plurality of wash water injectors 114; however, the supplemental wash water injector 123 may also be positioned upstream of the plurality of wash water injectors 114 in some embodiments. The wash water pipe 121 may further comprise a valve 125 between the outlet 124 and the supplemental wash water injector 123. Valve 125 may be any suitable valve including but not limited to a globe valve, a gate valve, a ball valve, a butterfly valve, or other type of valve. When valve 125 is open, additional wash water may be introduced into the crude oil pipe 110 through the supplemental wash water injector 123. This may allow the flow rate of water into the crude oil pipe 110 to be increased or allow wash water to bypass the plurality of wash water injectors 114. When valve 125 is closed, wash water may enter the crude oil pipe 110 through the plurality of wash water injectors 114 only.

The branched piping structure 122 may comprise a plurality of outlets 126. In embodiments, the number of outlets 126 in the branched piping structure 122 may equal the number of wash water injectors 114 in the crude oil pipe 110. Each of the plurality of outlets 126 in the branched piping structure 122 may be fluidly connected to one of the wash water injectors 114 by one of the conduits 130. Each of the plurality of wash water injectors 114 may be fluidly coupled to the wash water manifold 120 by one of a plurality of conduits 130.

In embodiments, each of the plurality of conduits 130 may be cylindrically shaped conduits that may have a substantially circular cross-sectional shape. In embodiments, the plurality of conduits 130 may be non-cylindrical conduits that have a cross-sectional shape that is non-circular, such as a cross-sectional shape that is but not limited to a triangle, rectangle, pentagon, hexagon, octagon, oval, other polygon or curved closed shape or combinations thereof. In embodiments, the plurality of conduits 130 may comprise carbon steel, stainless steel, or other suitable metals or alloys. Furthermore, the plurality of conduits 130 may be either rigid or flexible. In embodiments, the plurality of conduits may comprise polymer, rubber, or composites. For example, the plurality of conduits may comprise rubber hoses or polymer hose with a metal wire reinforcement. In embodiments, each of the plurality of conduits 130 may be directly connected to one of the wash water injectors 114 of the crude oil pipe 110.

In embodiments, each of the plurality of conduits 130 may further comprise a valve 131 positioned between the plurality of outlets 126 in the wash water manifold 120 and the plurality of wash water injectors 114 in the crude oil pipe. The valve 131 may be any suitable valve including but not limited to a globe valve, a gate valve, a ball valve, a butterfly valve, or other type of valve. Each of the plurality of valves 131 may be operable to control the flow of wash water into and through one of the wash water injectors 114 in the crude oil pipe 110. Additionally, each of the plurality of valves 131 may be closed to prevent the flow of wash water into the crude oil pipe 110 through one or more of the wash water injectors 114.

In embodiments, the apparatus 102 may comprise a flow controller 180. In embodiments, the flow controller 180 may be operable to regulate wash water 106 flow through the plurality of conduits 130. The flow controller 180 may be communicatively coupled to at least one control valve 182. The flow controller 180 may include at least one processor 184, at least one memory module 186 communicatively coupled to the at least one processor 184, and machine readable and executable instructions 188 stored on the at least one memory module 186, that when executed by the at least one processor 184 may cause the flow controller 180 to adjust the position of the at least one control valve 182 and vary the flow rate, pressure, and velocity of the wash water 106 passing through the wash water manifold 120, the plurality of conduits 130, and the plurality of wash water injectors 114.

The flow controller 180 described in the present disclosure is an example of a suitable computing device but does not suggest any limitation on the scope of any embodiments presented. It is understood that various methods and control schemes described in the present disclosure may be implemented using one or more analog control devices in addition to, or as an alternative to, the flow controller 180. The flow controller 180 may include, but is not limited to, an industrial controller, desktop computer, laptop computer, server, client computer, tablet, smartphone, or any other type of device that can send data, receive data, store data, and perform one or more calculations. The flow controller 180 can include a display. The flow controller 180 may further include one or more input devices which can include, by way of example, any type of mouse, keyboard, keypad, radio buttons, toggle switches, touchscreen, sensors, or any suitable input device. In embodiments, the input devices may include a plurality of the sensors (not shown), such as pressure sensors, flowrate sensors, or other sensors, positioned at various points in the system 100. The flow controller 180 may be connected to the input devices and the one or more control valves by any suitable means, including a wireless network or a wired network.

In embodiments, the system 100 may comprise one or more control valves 182 communicatively coupled to the flow controller 180. Referring to FIG. 1, a single control valve 182 could be located in the wash water manifold 120 upstream of the plurality of conduits 130 such that the flow of wash water 106 through the plurality of conduits 130 to the plurality of wash water injectors 114 is controlled from a single location. In embodiments, a multiple control valve 182 may be positioned in the wash water manifold 120. In embodiments, each of the plurality of conduits 130 may comprise a control valve 182 operable to control the flow of wash water 106 to each of the plurality of wash water injectors 114 individually. Referring to FIG. 5, each of the valves 131 may be control valves and may be communicatively coupled to the flow controller 180 such that the flow of wash water 106 through each of the plurality of wash water injectors 114 can be controlled individually.

Depictions of the flow controller 180 in FIGS. 1 and 5 are simplified representations of the flow controller 180. Many components of the flow controller 180 have been omitted for purposes of clarity. Assembling various hardware components into a functioning controller is considered to be part of the ordinary skill in the art.

The flow controller 180 may be operable to inject wash water 106 through the plurality of wash water injectors 114 such that a collective volumetric flow rate of the wash water 106 injected through all the wash water injectors 114 is less than or equal to 20% of a volumetric flow rate of the crude oil 104 in the crude oil pipe 110. For example, the flow controller 180 may be operable to inject wash water 106 through the plurality of wash water injectors 114 such that a collective volumetric flow rate of the wash water 106 injected through all the wash water injectors 114 is less than or equal to 20%, less than or equal to 18%, less than or equal to 16%, less than or equal to 14%, less than or equal to 12%, less than or equal to 10%, less than or equal to 8%, less than or equal to 6%, less than or equal to 4%, or even less than or equal to 2% of a volumetric flow rate of the crude oil 104 in the crude oil pipe 110. In embodiments, the flow controller 180 may be operable to inject wash water 106 through the plurality of wash water injectors 114 such that a collective volumetric flow rate of the wash water 106 injected through all the wash water injectors 114 is from 10% to 20% of a volumetric flow rate of the crude oil 104 in the crude oil pipe 110. In embodiments, the flow controller 180 may be operable to inject wash water 106 through the plurality of wash water injectors 114 such that a collective volumetric flow rate of the wash water 106 injected through all the wash water injectors 114 is from 15% to 20% of a volumetric flow rate of the crude oil 104 in the crude oil pipe 110.

The flow controller 180 may be operable to inject the wash water 106 such that the wash water 106 being injected into the crude oil pipe 110 may have a flow rate through each of the plurality of wash water injectors 114 of from 25 gallons per minute (gpm) (0.00158 $m^3/s$) to 35 gpm (0.00221 $m^3/s$) cubic meters per second). In embodiments, the flow controller 180 may produce a flow of wash water 106 where the flow rate of the wash water 106 through each of the plurality of wash water injectors 114 may be from 25 gpm (0.00158 $m^3/s$) to 35 gpm (0.00221 $m^3/s$), from 25 gpm (0.00158 $m^3/s$) to 33 gpm (0.00208 $m^3/s$), from 25 gpm (0.00158 $m^3/s$) to 31 gpm (0.00196 $m^3/s$), from 25 gpm (0.00158 $m^3/s$) to 29 gpm (0.00183 $m^3/s$), from 25 gpm (0.00158 $m^3/s$) to 27 gpm (0.00170 $m^3/s$), from 27 gpm (0.00170 $m^3/s$) to 35 gpm (0.00221 $m^3/s$), from 29 gpm (0.00183 $m^3/s$) to 35 gpm (0.00221 $m^3/s$), from 31 gpm (0.00196 $m^3/s$) to 35 gpm (0.00221 $m^3/s$), from 33 gpm (0.00208 $m^3/s$) to 35 gpm (0.00221 $m^3/s$), or any combination or sub-combination of these ranges.

The flow controller 180 may be operable to inject the wash water 106 such that a pressure of the wash water 106 is from 100 pounds per square inch (psi) (690,000 Pascal (Pa)) to 220 psi (1,520,000 Pa) at each of the plurality of wash water injectors 114. For example, the flow controller 180 may be operable to inject the wash water 106 such that a pressure of the wash water 106 is from 100 psi (690,000 Pa) to 220 psi (1,520,000 Pa), from 110 psi (76,000 Pa) to 220 psi (1,520,000 Pa), from 120 psi (83,000 Pa) to 220 psi (1,520,000 Pa), from 130 psi (90,000 Pa) to 220 psi (1,520,000 Pa), from 140 psi (97,000 Pa) to 220 psi (1,520,000 Pa), from 150 psi (1,030,000 Pa) to 220 psi (1,520,000 Pa), from 160 psi (1,100,000 Pa) to 220 psi (1,520,000 Pa), from 170 psi (1,170,000 Pa) to 220 psi (1,520,000 Pa), from 180 psi (1,240,000 Pa) to 220 psi (1,520,000 Pa), from 190 psi (1,310,000 Pa) to 220 psi (1,520,000 Pa), from 200 psi (1,340,000 Pa) to 220 psi (1,520,000 Pa), from 210 psi (1,450,000 Pa) to 220 psi (1,520,000 Pa), from 100 psi (690,000 Pa) to 210 psi (1,450,000 Pa), from 100 psi (690,000 Pa) to 200 psi (1,340,000 Pa), from 100 psi (690,000 Pa) to 190 psi (1,310,000 Pa), from 100 psi (690,000 Pa) to 180 psi (1,240,000 Pa), from 100 psi (690,000 Pa) to 170 psi (1,170,000 Pa), from 100 psi (690,000 Pa) to 160 psi (1,100,000 Pa), from 100 psi (690,000 Pa) to 150 psi (1,030,000 Pa), from 100 psi (690,000 Pa) to 140 psi (97,000 Pa), from 100 psi (690,000 Pa) to 130 psi (90,000 Pa), from 100 psi (690,000 Pa) to 120 psi (83,000 Pa), from 100 psi (690,000 Pa) to 110 psi (76,000 Pa), or any combination or sub-combination of these ranges. In embodiments, the flow controller 180 may be operable to inject the wash water 106 such that a pressure of the wash water 106 is from 120 psi to 220 psi at each of the plurality of wash water injectors 114. In embodiments, the flow controller 180 may be operable to inject the wash water 106 such that a pressure of the wash water 106 is from 150 psi to 220 psi at each of the plurality of wash water injectors 114.

The flow controller 180 may be operable to inject the wash water 106 through the plurality of wash water injectors 114 at an average velocity from 10% to 40% greater than an average velocity of the crude oil 104 in the crude oil pipe 110. For example, the flow controller 180 may be operable to inject the wash water 106 through the plurality of wash water injectors 114 at an average velocity from 10% to 40%, from 20% to 40%, from 30% to 40%, from 10% to 30%, or from 10% to 20% greater than an average velocity of the crude oil 104 in the crude oil pipe 110. In embodiments, the flow controller 180 may be operable to inject the wash water 106 through the plurality of wash water injectors 114 at an average velocity from 10% to 35% greater than an average velocity of the crude oil 104 in the crude oil pipe 110. In embodiments, the flow controller 180 may be operable to inject the wash water 106 through the plurality of wash water injectors 114 at an average velocity from 10% to 30% greater than an average velocity of the crude oil 104 in the crude oil pipe 110.

Referring again to FIG. 1, the system 100 may include the pressure differential valve 140, which may be positioned in the crude oil pipe 110 downstream of the plurality of wash water injectors 114 and downstream of the supplemental wash water injector 123, when present. The pressure differential valve 140 may be a globe valve or any other type of valve capable of imparting shear forces on mixed stream 128, which comprises an emulsion of wash water in crude oil that forms when the wash water is injected into the crude oil. Without intending to be bound by theory, it is believed that the pressure differential valve 140 may create a pressure drop in the crude oil pipe 110. This may impart a shear force onto the water droplets dispersed in the crude oil in the mixed stream 128 and may result in further mixing of the water and crude oil in the mixed stream 128. It is believed that further mixing of the wash water and crude oil in mixed stream 128 may increase the efficiency of the desalting process, resulting in desalted crude oil with a lesser salt content and a reduction in the consumption of wash water by the desalting process.

In embodiments, the mixed stream 128 may not require additional mixing by a pressure differential valve 140 downstream of the apparatus 102. In these embodiments, the system 100 for desalting crude oil may further comprise a bypass line 150 directly connected to the crude oil pipe 110 downstream from the plurality of wash water injectors 114 and upstream of the pressure differential valve 140. The system may further comprise an isolation valve 160 positioned between the pressure differential valve 140 and the bypass line 150. The isolation valve 160 may be any suitable valve including but not limited to a globe valve, a gate valve, a ball valve, a butterfly valve, or other type of valve.

Additionally, the system 100 may comprise a bypass valve 151 positioned in the bypass line 150. The bypass valve 151 may be any suitable valve including but not limited to a globe valve, a gate valve, a ball valve, a butterfly valve, or other type of valve. In embodiments where the mixed stream 128 does not require further mixing by the pressure differential valve 140, the mixture of crude oil and wash water may bypass the pressure differential valve 140 when the isolation valve 160 is closed and the bypass valve 151 is open. In embodiments where the mixed stream 128 does require further mixing, the bypass valve 151 may be closed and the isolation valve 160 may be open to allow flow of the mixed stream 128 through the pressure differential valve 140. It should also be noted that the bypass line 150 may also be used to redirect the flow of the mixed stream 128 comprising the crude oil and wash water to allow for maintenance on the pressure differential valve 140 without an interruption in the desalting process.

Referring again to FIG. 1, the system for desalting crude oil may comprise a separator vessel 170. The separator vessel 170 may be any vessel operable to separate the mixed stream 128 into a water phase 172 and an oil phase 174 comprising the desalted crude oil. In embodiments, the separator vessel 170 may be a gravity separator in which water droplets coalesce and settle toward the bottom of the vessel to form the water phase 172 and the crude oil remains as the oil phase 174 separate from the water phase 172. In embodiments, the separator vessel 170 may comprise one or more electrodes. The electrodes may generate an electrostatic field that may accelerate the coalescence of water droplets within the mixed stream 128. The separator vessel 170 may be sized such that the residence time of the mixed stream 128 within the separator vessel 170 allows for sufficient coalescence of the water phase 172 and the settling of the wash water from the crude oil to produce the water phase 172 and the oil phase 174 separate from the water phase 172. In embodiments, the separator vessel 170 may comprise an oil phase outlet near the top of the separator vessel through which oil phase 174 comprising the desalted crude oil may exit the separator vessel 170. The separator vessel 170 may also comprise a water phase outlet near the bottom of the separator vessel where water phase 172 may exit the separator vessel 170.

Referring again to FIG. 1, methods for mixing crude oil 104 and wash water 106 will now be described. Methods of the present disclosure for mixing crude oil 104 and wash water 106 may include passing crude oil 104 through the crude oil pipe 110 and injecting wash water 106 into the crude oil pipe 110 through the plurality of wash water injectors 114 to produce the mixed stream 128, which comprises a mixture of the crude oil 104 and wash water 106. The crude oil pipe 110 and the plurality of wash water injectors 114 may have any of the features or characteristics previously described for the crude oil pipe 110 and wash water injectors 114. The crude oil 104 may be passed through the crude oil pipe 110 by any suitable means, such as but not limited to pumping the crude oil 104 through the crude oil pipe 110. The bulk flow of the crude oil 104 through the crude oil pipe 110 may be substantially parallel to the central axis 115 of the crude oil pipe 110.

As the crude oil 104 passes through the crude oil pipe 110, injecting the wash water 106 into the crude oil pipe 110 may cause mixing of the wash water 106 with the crude oil 104 to form the mixed stream 128. Injecting the wash water 106 into the crude oil pipe 110 may include passing the wash water 106 to and through the wash water injectors 114, which may be distributed through 360 degrees around the crude oil pipe 110. In embodiments, the methods may include passing wash water 106 from the wash water manifold 120, through a plurality of conduits 130, to each of the plurality of wash water injectors 114 in the crude oil pipe 110.

In embodiments, the methods may include passing wash water 106 to the plurality of wash water injectors 114 through wash water manifold 120. Passing the wash water 106 through the wash water manifold 120 may include passing the wash water 106 by any suitable means, including but not limited to pumping or gravity feeding the wash water 106 through the wash water manifold 120. Distributing the wash water 106 through the wash water manifold 120 to each of the plurality of wash water injectors 114 may include passing the wash water 106 through a wash water pipe 121. The wash water 106 may exit the wash water pipe 121 through outlet 124 to enter a branched piping structure 122. In embodiments, the methods may include passing wash water 106 directly from the wash water pipe 121 to the crude oil pipe 110 through supplemental wash water injector 123. The methods may include passing the wash water 106 through the branched piping structure 122 and through a plurality of outlets 126. The methods may include passing the wash water 106 out of the wash water manifold 120 through outlets 126 and passing the wash water through conduits 130 to the plurality of wash water injectors 114. The method may then include injecting the wash water 106 into the crude oil pipe 110 through the plurality of wash water injectors 114.

Injecting the wash water 106 into the crude oil pipe 110 may occur at a volumetric flow rate sufficient to increase turbulence in the crude oil pipe 110 to cause mixing of the wash water 106 and the crude oil 104 to produce the mixed stream 128. In embodiments, injecting the wash water 106 into the crude oil pipe 110 may occur at a volumetric flow rate that is less than or equal to 20% of a volumetric flow rate of the crude oil 104 in the crude oil pipe 110. For example, injecting the wash water 106 into the crude oil pipe 110 may occur at a volumetric flow rate that is less than or equal to 20%, less than or equal to 18%, less than or equal to 16%, less than or equal to 14%, less than or equal to 12%, less than or equal to 10%, less than or equal to 8%, less than or equal to 6%, less than or equal to 4%, or even less than or equal to 2% of a volumetric flow rate of the crude oil 104 in the crude oil pipe 110. In embodiments, injecting the wash water 106 into the crude oil pipe 110 may occur at a volumetric flow rate that is from 10% to 20% of a volumetric flow rate of the crude oil 104 in the crude oil pipe 110. In embodiments, injecting the wash water 106 into the crude oil pipe 110 may occur at a volumetric flow rate that is from 15% to 20% of a volumetric flow rate of the crude oil 104 in the crude oil pipe 110.

The wash water 106 being injected into the crude oil pipe 110 may have a flow rate through each wash water injector 114 of from 25 gallons per minute (gpm) (0.00158 $m^3/s$) to 35 gpm (0.00221 $m^3/s$) cubic meters per second). In embodiments, the flow rate of the wash water through each wash water injector may be from 25 gpm (0.00158 $m^3/s$) to 35 gpm (0.00221 $m^3/s$), from 25 gpm (0.00158 $m^3/s$) to 33 gpm (0.00208 $m^3/s$), from 25 gpm (0.00158 $m^3/s$) to 31 gpm (0.00196 $m^3/s$), from 25 gpm (0.00158 $m^3/s$) to 29 gpm (0.00183 $m^3/s$), from 25 gpm (0.00158 $m^3/s$) to 27 gpm (0.00170 $m^3/s$), from 27 gpm (0.00170 $m^3/s$) to 35 gpm (0.00221 $m^3/s$), from 29 gpm (0.00183 $m^3/s$) to 35 gpm (0.00221 $m^3/s$), from 31 gpm (0.00196 $m^3/s$) to 35 gpm (0.00221 $m^3$/s), from 33 gpm (0.00208 $m^3$/s) to 35 gpm (0.00221 $m^3$/s), or any combination or sub-combination of these ranges.

Injecting the wash water 106 into the crude oil pipe 110 may occur at a pressure from 100 psi to 200 psi at each of the plurality of wash water injectors 114. In embodiments, injecting the wash water 106 into the crude oil pipe 110 may occur at a pressure from 110 psi to 200 psi at each of the plurality of wash water injectors 114. In embodiments, injecting the wash water 106 into the crude oil pipe 110 may occur at a pressure from 140 psi to 200 psi at each of the plurality of wash water injectors 114.

In embodiments, the method may include injecting wash water 106 into the crude oil 104 flowing through the crude oil pipe 110, where the plurality of wash water injectors 114 may be oriented to define a wash water injection direction 116 that is within 90 degrees of a radial line 118 that extends outward from the central axis 115 of the crude oil pipe 110. In embodiments, the method may include injecting wash water 106 into the crude oil 104 flowing through the crude oil pipe 110, where the plurality of wash water injectors 114 may be oriented to define a wash water injection direction 116 that is within 85 degrees of a radial line 118 that extends outward from the central axis 115 of the crude oil pipe 110. In embodiments, the method may include injecting wash water 106 into the crude oil 104 flowing through the crude oil pipe 110, where the plurality of wash water injectors 114 may be oriented to define a wash water injection direction 116 that is within 80 degrees of a radial line 118 that extends outward from the central axis 115 of the crude oil pipe 110.

As previously discussed, in embodiments, the plurality of wash water injectors 114 may be oriented such that the wash water injection direction 116 of each of the plurality of wash water injectors 114 may be normal relative to the exterior surface 113, the interior surface 112, or both of the crude oil pipe 110. In such embodiments, the method may include injecting the wash water 106 into the crude oil pipe 110 where the velocity vector of the wash water 106 is in a direction that is substantially normal to the direction of the bulk flow of the crude oil 104 within the crude oil pipe 110.

The method may include injecting the wash water 106 through the plurality of wash water injectors 114 at an average velocity from 10% to 40% greater than an average velocity of the crude oil 104 in the crude oil pipe 110. In embodiments, the method may include injecting the wash water 106 through the plurality of wash water injectors 114 at an average velocity from 10% to 35% greater than an average velocity of the crude oil 104 in the crude oil pipe 110. In embodiments, the method may include injecting the wash water 106 through the plurality of wash water injectors 114 at an average velocity from 10% to 30% greater than an average velocity of the crude oil 104 in the crude oil pipe 110.

Without intending to be bound by theory, it is believed that injecting wash water 106 into the crude oil pipe 110 at the pressure, flow rate, velocity, or combinations of these previously discussed may result in increased mixing between the wash water 106 and the crude oil 104. Specifically, the velocity, pressure, flow rate, or combinations of these of the wash water 106 may cause an increase in turbulence in the crude oil 104 when the wash water is injected into the crude oil pipe 110. This turbulence may promote intimate contact between the wash water 106 and the crude oil 104, resulting in salts present in the crude oil 104 transferring from the crude oil 104 into the wash water 106. It is believed that the mixing provided by the presently described methods may be superior to conventional methods where wash water 106 is injected into the crude oil pipe 110 through a single wash water injector because the presently described methods may provide increased turbulence in the flow of the crude oil 104 and wash water 106 in the crude oil pipe 110 during formation of the mixed stream 128.

The turbulence of the flow of crude oil 104 and wash water 106 in the crude oil pipe 110 when the wash water is injected into the crude oil pipe 110 through the plurality of wash water injectors 114 may be from 45% to 70% greater than the turbulence of the flow of crude oil 104 and wash water 106 in the crude oil pipe 110 when the wash water 106 is injected only through the supplemental wash water injector 123. In embodiments, the turbulence of the flow of crude oil 104 and wash water 106 in the crude oil pipe 110 when the wash water 106 is injected into the crude oil pipe 110 through the plurality of wash water injectors 114 may be from 45% to 70% greater, from 50% to 70% greater, from 55% to 70% greater, from 60% to 70% greater, from 65% to 70% greater, from 45% to 65% greater, from 45% to 60% greater, from 45% to 55% greater, or from 45% to 50% greater than the turbulence of the flow of crude oil 104 and wash water 106 in the crude oil pipe 110 when the wash water 106 is injected only through the supplemental wash water injector 123.

As described herein, the method for mixing crude oil 104 with wash water 106 may be incorporated into a method for desalting crude oil. Methods for desalting crude oil of the present disclosure may include passing crude oil 104 through the crude oil pipe 110 and injecting wash water 106 into the crude oil pipe 110 through the plurality of wash water injectors 114 to produce the mixed stream 128, which comprises a mixture of the crude oil 104 and wash water 106, as previously discussed. The methods for desalting crude oil may further comprise passing the mixed stream 128 through the pressure differential valve 140 and separating the mixed stream 128 into a water phase 172 and an oil phase 174 in the separator vessel 170 downstream of the pressure differential valve 140.

In embodiments, the methods may include passing the mixed stream 128 through a pressure differential valve 140 that is positioned in the crude oil pipe 110 downstream from the plurality of wash water injectors 114. Passing the mixed stream 128 through the pressure differential valve 140 may impart shear forces on wash water droplets distributed throughout the crude oil in the mixed stream 128. This may result in mixing between the wash water 106 and the crude oil 104 that is additional to the mixing that occurs when the wash water 106 is injected into the crude oil 104. As such, passing the mixed stream 128 through the pressure differential valve 140 may result in increased contact between the wash water 106 and the crude oil 104.

In embodiments, the methods of the present disclosure for desalting crude oil may include bypassing the mixed stream 128 around the pressure differential valve 140. In such embodiments, the methods may include passing the mixed stream 128 through bypass line 150. The methods may further include reintroducing the mixed stream 128 to the crude oil pipe 110 downstream of the pressure differential valve 140. In embodiments, the method may include passing the mixed stream 128 directly from the bypass line 150 to the separator vessel 170.

In embodiments, the method may include passing the mixed stream 128 to the separator vessel 170. In the separator vessel 170, droplets of wash water 106 dispersed in the crude oil 104 may coalesce and settle to the bottom of the separator vessel 170 to form a water phase 172. In embodiments, the method may include generating an electrical field within the separator vessel 170 to increase the rate of coalescence of the wash water droplets. As the wash water droplets coalesce within the separator vessel 170, the wash water droplets generally settle toward a water phase 172 in the bottom of the separator vessel 170 and the crude oil generally moves toward an oil phase 174 at the top of the separator vessel 170. The methods may include passing the oil phase 174 through an outlet located at the top of the separator vessel 170 and passing the water phase 172 through an outlet located at the bottom of the separator vessel 170.

In embodiments, the crude oil separated from the wash water, the desalted crude oil, may have a salinity below a target salinity. The target salinity may be less than or equal to 10 pounds per thousand barrels (PTB) (0.29 kg/$m^3$).

EXAMPLES

The examples are representative of embodiments of the presently disclosed subject matter, and are not meant as limiting the scope of the claims. The following examples discuss the performance of an apparatus for mixing crude oil in water used in a crude oil desalting process.

A first crude oil desalting system using a plurality of wash water injectors to inject wash water into the crude oil pipe was compared to a second crude oil desalting system using a single wash water injector in the crude oil pipe. Each of the crude oil desalting systems had a processing capacity of 170 million barrels per day (27 million $m^3$ per day).

The first crude oil desalting system comprised a 20 inch (50.8 cm) crude oil pipe. Four one inch (2.54 cm) wash water injectors were angularly distributed on a circumferential band of the crude oil pipe. The wash water injectors were connected to a wash water manifold. The wash water manifold also connected to the crude oil line at a four inch (10.2 cm) supplemental wash water injector. A pressure differential valve was located in the crude oil pipe downstream of the wash water injectors. A separation vessel was located downstream of the pressure differential valve.

The second crude oil desalting system also comprised a 20 inch (50.8 cm) crude oil pipe. However, a single four inch (10.2 cm) wash water injector supplied wash water to the crude oil pipe. The second crude oil desalting system also comprised a pressure differential valve downstream of the wash water injector and a separation vessel downstream of the pressure differential valve.

Once both the first and second crude oil desalting systems were brought to steady state the following observations were made. The wash water entering the first crude oil desalting system through the four one inch wash water injectors had a velocity that was 20-30% higher than the velocity of the wash water entering the second crude oil desalting system through the single four inch wash water injector. As such, the pressure drop across the wash water injectors in the first crude oil desalting system was from about 5% to about 15% lower than the pressure drop across the wash water injector in the second crude oil desalting system. As a result of the velocity and pressure drop changes, the turbulence within the crude oil pipe of the first crude oil desalting system increased by about 50%.

The increased turbulence in the first crude oil desalting system resulted in more efficient mixing between the crude oil and the wash water. As such, the wash water consumption in the first crude oil desalting system was about 11% lower, or 5 gpm (0.000315 $m^3$/s) lower, than the wash water consumption of the second crude oil desalting system. Additionally, the salinity of the desalted crude oil produced by the first crude oil desalting system was about 0.5 to 1.5 PTB (0.0014 to 0.0043 kg per $m^3$) lower than the desalted crude oil produced by the second crude oil desalting system. Therefore, the first crude oil desalting system using a plurality of wash water injectors positioned angularly on a circumferential band of the crude oil pipe resulted in decreased wash water consumption and increased salt removal over the second crude oil desalting system using a single wash water injector.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term “wherein” as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term “comprising.” Furthermore, it should be understood that where a first component is described as “comprising” a second component, it is contemplated that, in some embodiments, the first component “consists” or “consists essentially of” that second component.

It should be understood that any two quantitative values assigned to a property may constitute a range of that property, and all combinations of ranges formed from all stated quantitative values of a given property are contemplated in this disclosure.

What is claimed is:

1. An apparatus for mixing crude oil and wash water, the apparatus comprising a crude oil pipe, a wash water manifold, a plurality of conduits, a flow controller, and a pressure differential valve, where:

the wash water manifold comprises a wash water pipe fluidly coupled to a branched piping structure;

the crude oil pipe comprises a wall having an interior surface, an exterior surface, and a plurality of wash water injectors, wherein the crude oil pipe is directly connected to the wash water pipe, and wherein the wash water pipe is directly connected to the crude oil pipe at a supplemental wash water injector;

the plurality of wash water injectors are angularly distributed on a circumferential band of the wall of the crude oil pipe relative to a central axis of the crude oil pipe, where a length of the circumferential band of the crude oil pipe is less than or equal to 7 cm;

the flow controller is operable to regulate wash water flow through the plurality of conduits;

each of the plurality of wash water injectors is fluidly coupled to the wash water manifold by one of the plurality of conduits;

each of the plurality of wash water injectors is operable to inject wash water into the crude oil pipe toward the central axis of the crude oil pipe and to contact the injected wash water with the crude oil at an injection interface aligned with the interior surface of the wall of the crude oil pipe;

each of the plurality of wash water injectors is oriented to define a wash water injection direction that is within 90 degrees of a radial line that extends outward from a central axis of the crude oil pipe;

the flow controller is operable to inject wash water through the plurality of wash water injectors such that a collective volumetric flow rate of wash water injected through all of the wash water injectors is less than or equal to 20% of a volumetric flow rate of crude oil in the crude oil pipe;

the flow controller is operable to inject wash water through the plurality of wash water injectors at an average velocity from 10% to 40% greater than an average velocity of the crude oil in the crude oil pipe;

the plurality of wash water injectors are arranged to provide mixing of the wash water and the crude oil when the wash water is injected into the crude oil pipe through the plurality of wash water injectors;

the pressure differential valve is positioned in the crude oil pipe downstream of the wash water injectors; and the pressure differential valve is operable to provide further mixing of a mixed stream comprising the combination of the crude oil and the wash water.

2. The apparatus of claim 1, where the wash water injection direction is within 85 degrees of the radial line that extends outward from the central axis of the crude oil pipe.

3. The apparatus of claim 1, where the plurality of wash water injectors are oriented to collectively define wash water injection directions that are normal to the central axis of the crude oil pipe, comprise a component in a downstream direction, comprise a component in an upstream direction, or combinations thereof.

4. The apparatus of claim 3, where the wash water injection directions intersect the central axis of the crude oil pipe.

5. The apparatus of claim 1, where the flow controller is operable to inject wash water through the plurality of wash water injectors such that a collective volumetric flow rate of wash water injected through all of the wash water injectors is from 10% to 20% of the volumetric flow rate of crude oil in the crude oil pipe.

6. The apparatus of claim 1, where the flow controller is operable to:

inject the wash water through the plurality of wash water injectors at an average velocity from 10% to 30% greater than an average velocity of the crude oil in the crude oil pipe; or inject the wash water such that a pressure of the wash water is from 110 psi to 200 psi at each of the plurality of wash water injectors.

7. The apparatus of claim 1, where each of the plurality of wash water injectors is oriented to define a wash water injection direction that is within 85 degrees of a radial line that extends outward from a central axis of the crude oil pipe, and the flow controller is operable to inject wash water through the plurality of wash water injectors such that a collective volumetric flow rate of wash water injected through all of the wash water injectors is from 10% to 20% of the volumetric flow rate of crude oil in the crude oil pipe.

8. The apparatus of claim 1, where each of the plurality of wash water injectors is oriented to define a wash water injection direction that is within 85 degrees of a radial line that extends outward from a central axis of the crude oil pipe, and the flow controller is operable to inject the wash water through the plurality of wash water injectors at an average velocity from 10% to 30% greater than an average velocity of the crude oil in the crude oil pipe.

9. The apparatus of claim 1, where the flow controller is operable to inject wash water through the plurality of wash water injectors such that a collective volumetric flow rate of wash water injected through all of the wash water injectors is from 10% to 20% of the volumetric flow rate of crude oil in the crude oil pipe, and the flow controller is operable to inject the wash water through the plurality of wash water injectors at an average velocity from 10% to 30% greater than an average velocity of the crude oil in the crude oil pipe.

10. The apparatus of claim 1, where:

each of the plurality of wash water injectors is oriented to define a wash water injection direction that is within 85 degrees of a radial line that extends outward from a central axis of the crude oil pipe;

the flow controller is operable to inject wash water through the plurality of wash water injectors such that a collective volumetric flow rate of wash water injected through all of the wash water injectors is from 10% to 20% of the volumetric flow rate of crude oil in the crude oil pipe; and the flow controller is operable to inject the wash water through the plurality of wash water injectors at an average velocity from 10% to 30% greater than an average velocity of the crude oil in the crude oil pipe.

11. The apparatus of claim 1, where:

the plurality of wash water injectors are angularly distributed on the circumferential band of the wall of the crude oil pipe relative to the central axis of the crude oil pipe, where the length of the circumferential band of the crude oil pipe is less than or equal to 5 cm; or the plurality of wash water injectors are angularly distributed on the circumferential band of the wall of the crude oil pipe relative to the central axis of the crude oil pipe, where the length of the circumferential band of the crude oil pipe is less than or equal to 3% of a diameter of the crude oil pipe.

12. The apparatus of claim 1, where each of the plurality of wash water injectors do not extend inward towards the central axis of the crude oil pipe past the interior surface of the wall of the crude oil pipe.

13. The apparatus of claim 1, where the plurality of wash water injectors are spaced on the circumferential band by 90 degrees or less, relative to the central axis of the crude oil pipe.

14. The apparatus of claim 1, where the plurality of wash water injectors are spaced on the circumferential band by between 60 degrees and 90 degrees, relative to the central axis of the crude oil pipe.

15. The apparatus of claim 1, wherein the wash water pipe further comprises a valve between an outlet and the supplemental wash water injector.

16. A system for desalting crude oil, the system comprising:

the apparatus according to claim 1; and a separator vessel operable to separate the mixed stream into a water phase and an oil phase.

17. A method for mixing crude oil and wash water using the apparatus of claim 1, the method comprising passing crude oil through the crude oil pipe of the apparatus of claim 1 and injecting wash water into the crude oil pipe through the plurality of wash water injectors of the apparatus of claim 1 where:

the wash water is injected into the crude oil pipe through the plurality of wash water injectors such that a collective volumetric flow rate of wash water injected through all of the wash water injectors is less than or equal to 20% of a volumetric flow rate of crude oil in the crude oil pipe; and the wash water is injected into the crude oil pipe through the plurality of wash water injectors at an average velocity is from 10% to 40% greater than an average velocity of the crude oil in the crude oil pipe.

18. A method for desalting crude oil using the apparatus of claim 1, the method comprising passing crude oil through the crude oil pipe of the apparatus of claim 1, injecting wash water into the crude oil pipe through the plurality of wash water injectors of the apparatus of claim 1 to form a mixed stream, passing the mixed stream through a pressure differential valve, and separating the mixed stream into a water phase and an oil phase where:

the wash water is injected into the crude oil pipe through the plurality of wash water injectors such that a collective volumetric flow rate of wash water injected through all of the wash water injectors is less than or equal to 20% of a volumetric flow rate of crude oil in the crude oil pipe;

the wash water is injected into the crude oil pipe through the plurality of wash water injectors at an average velocity and is from 10% to 40% greater than an average velocity of the crude oil in the crude oil pipe;

the pressure differential valve is positioned in the crude oil pipe downstream of the wash water injectors and is operable to provide further mixing of the mixed stream; and the oil phase has a salinity below a target salinity.

19. The method of claim 18, where the target salinity is less than or equal to 10 pounds per thousand barrels.

* * * * *